United States Patent
Shelby et al.

(10) Patent No.: US 6,808,805 B2
(45) Date of Patent: Oct. 26, 2004

(54) PROCESS FOR PROFILE EXTRUSION OF A POLYESTER

(75) Inventors: Marcus David Shelby, Kingsport, TN (US); Julian Harold Scott Jensen, Blountville, TN (US); Daniel Christopher Cobb, Kingsport, TN (US); Marc Alan Strand, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/459,670

(22) Filed: Jun. 11, 2003

(65) Prior Publication Data

US 2003/0228479 A1 Dec. 11, 2003

Related U.S. Application Data

(62) Division of application No. 09/560,455, filed on Apr. 28, 2000, now Pat. No. 6,632,390.
(60) Provisional application No. 60/139,285, filed on Jun. 15, 1999.

(51) Int. Cl.[7] ............................................. C08G 63/02
(52) U.S. Cl. ...................................... 428/400; 428/543
(58) Field of Search ................................ 428/400, 357, 428/364, 542.8, 543; 264/167, 176.1; 524/155, 325; 528/486, 308.5, 272, 398, 300, 302, 307, 308, 308.6

(56) References Cited

U.S. PATENT DOCUMENTS

| | | |
|---|---|---|
| 4,034,013 A | 7/1977 | Lane |
| 4,161,579 A | 7/1979 | Edelman et al. |
| 4,182,841 A | 1/1980 | Hauenstein |
| 4,219,527 A | 8/1980 | Edelman et al. |
| 4,234,708 A | 11/1980 | Edelman et al. |
| 4,398,022 A | 8/1983 | Sublett |
| 4,918,156 A | 4/1990 | Rogers |
| 4,983,711 A | 1/1991 | Sublett et al. |
| 5,194,477 A * | 3/1993 | Liu et al. ..................... 524/382 |
| 5,235,027 A | 8/1993 | Thiele et al. |
| 5,268,438 A | 12/1993 | Carson et al. |
| 5,288,764 A | 2/1994 | Rotter et al. |
| 5,310,799 A | 5/1994 | Carson et al. |
| 5,340,846 A | 8/1994 | Rotter et al. |
| 5,376,735 A | 12/1994 | Sublett |
| 5,382,652 A | 1/1995 | Fukuda et al. |
| 5,442,036 A | 8/1995 | Beavers et al. |
| 5,446,111 A | 8/1995 | Rotter et al. |

(List continued on next page.)

Primary Examiner—Mark Eashoo
(74) Attorney, Agent, or Firm—B. J. Boshears; Bernard J. Groves, Jr.

(57) ABSTRACT

In a process for producing a profile by profile extrusion, a melt of a polyester composition is extruded through a die to form a profile. The processability of the polyester composition is improved by the addition of a branching agent, which provides increased melt strength and increased high shear thinning. The polyester composition has an inherent viscosity of at least 0.65 dl/g. The diacid component of the polyester composition has from 100 to 98.0 mole percent of residues of a primary acid selected from terephthalic acid, naphthalenedicarboxylic acid, isophthalic acid and mixtures thereof. The glycol component of the polyester composition has from 100 to 98.0 mole percent of residues of a primary glycol selected from ethylene glycol, 1,4-cyclohexanedimethanol, diethylene glycol, neopentyl glycol, and mixtures thereof. The polyester composition has from 0.05 to 2.0 mole percent of residues of the branching agent selected from an acidic branching agent with a tri-functional or greater monomer, an alcoholic branching agent with a tri-functional or greater monomer, and mixtures thereof. The branching agent is present as part of either the diacid component or glycol component depending on whether the functionality is acidic or alcoholic, respectively.

5 Claims, 4 Drawing Sheets

U.S. PATENT DOCUMENTS

| | | |
|---|---|---|
| 5,482,977 A | 1/1996 | McConnell et al. |
| 5,519,066 A | 5/1996 | McConnell et al. |
| 5,523,382 A | 6/1996 | Beavers et al. |
| 5,536,793 A | 7/1996 | Rotter et al. |
| 5,556,926 A | 9/1996 | Rotter et al. |
| 5,559,172 A * | 9/1996 | Kulich et al. ............... 524/155 |
| 5,648,032 A * | 7/1997 | Nelson et al. ............... 264/101 |
| 5,654,347 A | 8/1997 | Khemani et al. |
| 5,686,553 A * | 11/1997 | Tai et al. .................... 528/194 |
| 5,696,176 A | 12/1997 | Khemani et al. |
| 5,801,206 A | 9/1998 | Khemani et al. |
| RE35,939 E | 10/1998 | Fukuda et al. |
| 6,632,390 B1 * | 10/2003 | Shelby et al. ............ 264/176.1 |

\* cited by examiner

PROCESS FOR PROFILE EXTRUSION OF A POLYESTER

This application is a divisional of 09/560,455 filed Apr. 28, 2000, now U.S. Pat. No. 6,632,390.

This application claims the benefit of U.S. Provisional Application Ser. No. 60/139,285 filed Jun. 15, 1999 titled "Polyester Compositions for Profile Extrusion".

TECHNICAL FIELD OF THE INVENTION

This invention relates to profile extrusion of thermoplastic polymers to form shaped articles commonly referred to as profiles. More particularly, this invention relates to processes of profile extrusion utilizing certain polyester compositions.

BACKGROUND OF THE INVENTION

Thermoplastic polymers are commonly used to manufacture various shaped articles which may be utilized in applications such as automotive parts, food containers, signs, packaging materials and the like. Profile extrusion is a common, cost-effective method for producing these shaped articles. Polymers such as polyvinyl chloride (PVC), acrylics and polycarbonates are typically used in profile extrusion. Each of these polymers suffers from one or more disadvantages. PVC is undesirable from an environmental standpoint since PVC produces toxic gases during melt extrusion and is difficult to dispose of after use. Acrylic articles are brittle and shatter when dropped or struck against another object. Polycarbonate is difficult to work with from a processor's perspective and is too expensive for many applications. Polyesters, being notoriously difficult to process compared to many other polymers, have not been utilized as often in profile extrusion. As compared to polymers typically used in profile extrusion, polyesters have lower melt strengths and insufficient shear thinning resulting in a greater propensity for melt fracture if extruded at high output rates or low temperatures. Both melt strength and shear thinning are extremely important from the standpoint of profile extrusion.

Profiles are defined herein by a combination of two factors: shape and process of manufacture. The shape of a profile has a particular two-dimensional cross-section and an infinite length. The process of manufacture is known as profile extrusion. The cross-section lies in the x-y plane and the length lies along the z-axis. The x-y plane usually corresponds to the face of the die, whereas the z-axis corresponds to the extrusion or "take-off" direction. Profiles can take on a wide variety of cross-sections varying in size, shape and complexity. Common "simple" profile shapes include hollow tubes, solid round stock, square cross-section stock, etc. More complex shapes such as those used for pricing channels, corner guards, and house siding can also be made.

By this use of shape as part of the profile definition, fiber, film and sheet might also be considered as special classes of profiles. Fibers have very small circular cross-sections and are extruded continuously in one direction. Film and sheet have rectangular cross-sections and are extruded continuously. However, in the industry as a whole and as defined herein by the additional definition factor of process of manufacture, film, sheet and fiber are not profiles because of how they are manufactured. Film or sheet, while infinite in length, are manufactured by processes that include the use of calendering or chill rolls. Fiber processes involve very high drawdowns, along with spinning cabinets and godet rolls. Profiles, in the industrial vernacular, represent constant cross-section, axially extruded structures, which have axial rigidity and are not wound. Profiles are usually cut to length and bundled, stacked or otherwise bound for transport. This axial rigidity obviously has important implications for what kind of "haul-off" equipment is used to convey the extruded product. Furthermore, the issues of melt strength and melt fracture are not important factors in fiber, film and sheet due to the nature of the take-up/winding equipment and the fact that shape definition is already trivial. Thus, as defined in the industry and herein, "profile" shall not include fiber, film and sheet.

Profiles are fabricated by melt extrusion processes that begin by extruding a thermoplastic melt through an orifice of a die forming an extrudate capable of maintaining a desired shape. The extrudate is typically drawn into its final dimensions (along the z-axis) while maintaining the desired shape (in the x-y plane) and then quenched in air or a water bath to set the shape, thereby producing a profile. In the formation of simple profiles, the extrudate preferably maintains shape without any structural assistance. With extremely complex shapes, support means are often used to assist in shape retention. In either case, the type of thermoplastic resins utilized and its melt strength during formation is critical. Melt strength is defined as the ability of a polymer to support its weight in the molten state. For example, when extruded vertically from a die, a polymer with low melt strength will quickly sag and hit the floor; whereas, a polymer with high melt strength will maintain its shape for a much longer amount of time.

There are a number of quantitative and qualitative means for measuring melt strength. One standard test is disclosed in U.S. Pat. No. 4,398,022 wherein melt strengths for a polyester used in extrusion blow molding processes were measured at values between −10 and 10 percent. This same test is utilized herein and involves vertically extruding the polymer from a 0.1 inch (0.25 cm) diameter capillary die that is 0.25 inches (0.64 cm) long at a shear rate of 20 s$^{-1}$ up to a total length of 19 inches (49 cm). At this point the strand is cut near the die face and allowed to cool at room temperature. The diameter 6 inches (15 cm) from the end of the extrudate is then measured and expressed as a percentage change relative to the capillary diameter to give the melt strength. For example, if the strand diameter at a point 6 inches (15 cm) from the bottom was 0.12 inches (30 cm), then the polymer melt strength at that given melt temperature would be 20 percent (i.e. MS=(0.12−0.1)/0.1 *100 percent). Similarly, the "die swell" is obtained by measuring the diameter ½ inches (1.3 cm) from the bottom of the extrudate and expressing it as a percentage change relative to the capillary diameter.

Polyesters due to their poor melt strength may have a negative value for the melt strength since the 6 inches (15 cm) point diameter could be less than the nominal diameter. For example, linear poly(ethylene terephthalate) modified with 1,4-cyclohexanedimethanol (PETG) having an inherent viscosity (IV) of 0.76 dl/g has been observed to have a melt strength of −4 percent at 200° C. and −24 percent at 220° C. This means that the diameter of the extrudate measured 6 inches (15 cm) from the end of the strand was 4 percent smaller (200° C. sample) than the die opening. Typical melt strengths for PVC under standard processing conditions (160 to 200° C. processing temperature) are in the order of 20 to 30 percent. To achieve this melt strength with linear PETG would require an IV of around 0.95 dl/g. Thus, for applications in which melt strength is critical, polyesters will often not supplant these competitive polymers.

Another common melt strength test involves measuring the time period that an extrudate takes to reach a predetermined length below a die for a given flowrate/shear rate. While not standardized, this test provides an easy method for material comparison on a typical processing line and is used in some of the examples cited herein. Other non-standard melt strength tests such as measuring the degree of drooping in a horizontal profile extrusion line can also be applied giving a more application specific measure of melt strength.

Profile extrusions are usually run horizontally, and thus melt strength is important to minimize the amount of "drawdown" and gravity-induced sagging the polymer experiences upon exiting the die. Drawdown is defined in profile extrusion as the amount of thickness reduction between the die and the take-up system and is expressed as the nominal thickness or width dimension at the die divided by the same dimension in the final part). For example, a typical polyester drawdown is about two. This means that the width of the final part is ½ that of the width at the die exit. Similarly, the final thickness is ½ of the thickness at the die exit. The take-up force of the puller or winder causes drawdown as the melt exits the die. A higher melt strength reduces the amount of drawdown, since there is greater resistance to stretching and thinning. For example, the drawdown for higher melt strength PVC is more on the order of 1.25. Reduced drawdowns make designing the appropriate dies and maintaining critical final part dimensions much easier.

The inadequate melt strength of polyesters further results in severe processing problems when polyesters are processed at typical profile extrusion temperatures of 390–550° F. (200–290° C.) and line speeds. Processing line speeds vary considerably depending on the shape of the profile. Typical speeds for simple shapes like a corner guard may be from 50 to 70 feet (15 to 20 meters) per minute. More complicated shapes may have process line speeds as low as one foot (0.3 meters) per minute, whereas extremely simple shapes with certain types of processing technology may run at speeds as high as 100 feet (30 meters) per minute. At the higher speeds, which obviously would be preferred by profile manufacturers, inadequate melt strength produces an extrudate that does not maintain its shape prior to quenching, and thus deformation occurs. To increase the melt strength of the polyester, processing temperatures are often lowered. This, however, increases the likelihood of an undesirable phenomenon known as melt fracture, which can only be eliminated by lowering the extrusion speed. By decreasing speed, the economic attractiveness of using polyesters is also decreased. Thus, the profile extrusion processes are often operated at maximum speeds associated with the highest temperatures and minimal melt strengths for maintaining particular profile shapes. Any increase in speed or lowering of temperature may cause an increase in high shear viscosity in the die, which then may cause an undesirable melt fracture.

From a rheological standpoint, melt strength depends primarily on the viscosity and, to some degree, on the elasticity or relaxation time of the melt. A higher viscosity increases the resistance to drawdown/sagging. In contrast, melt elasticity causes an increase in die swell, which serves to offset some of the effects of drawdown. Even though the same amount of width/thickness reduction is occurring after the die, the highly elastic material starts with a much higher initial width/thickness due to the greater die swell. Thus, the final part dimensions remain closer to the die dimension and the effective drawdown seems lower (thereby making it easier to design the tooling needed).

Figure 1:
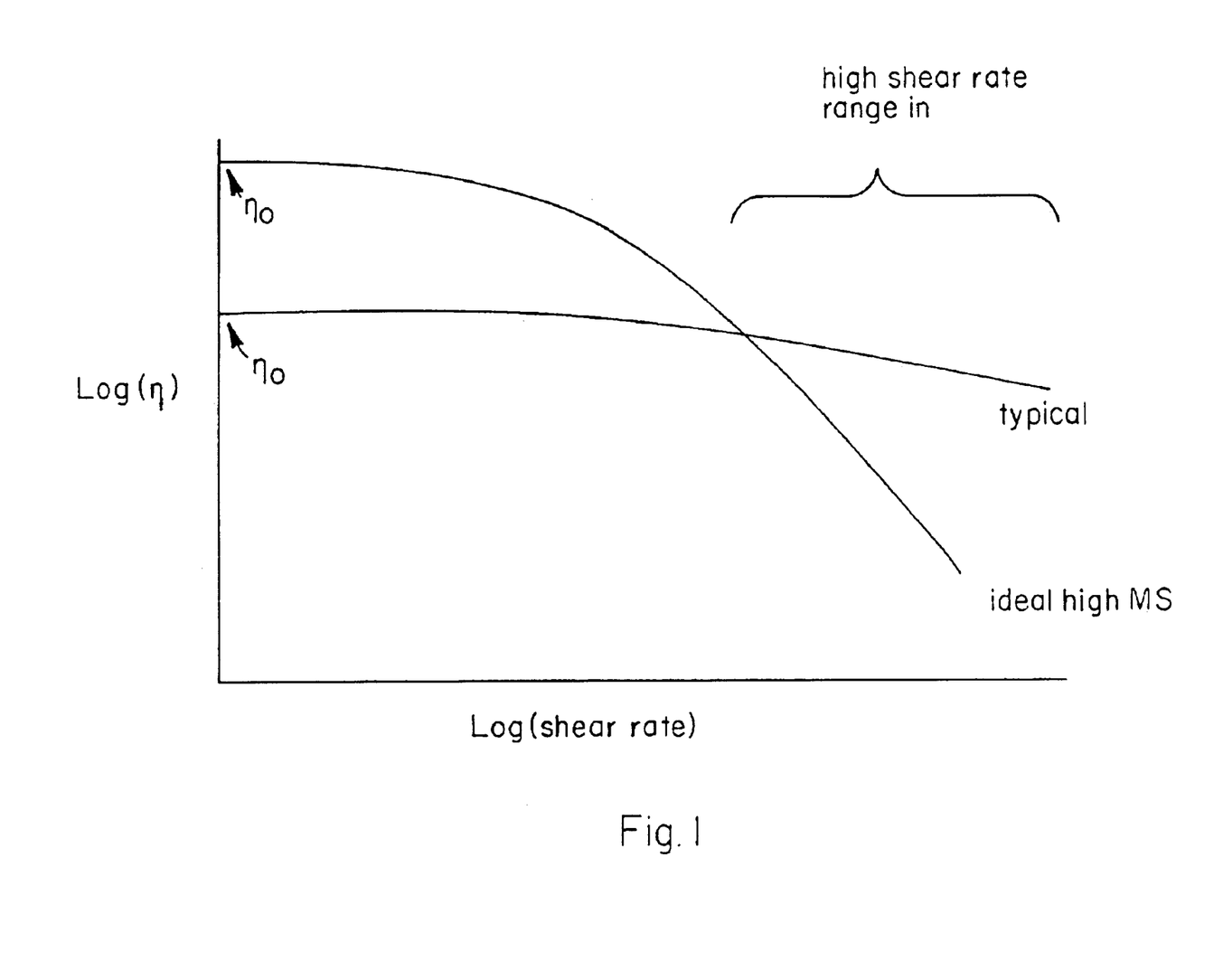
FIG. 1 is a typical viscosity versus shear rate curve for a standard polyester and an "ideal" resin having improved processability.

A viscosity curve for a given polymer has two regions of interest, as shown in FIG. 1. At very low shear rates the viscosity is highest and this is referred to as the "zero shear viscosity", $\eta_0$. The zero shear viscosity (along with the elasticity) defines the melt strength since the polymer is experiencing essentially a zero shear rate after exiting from the die. Thus, the higher the zero shear viscosity, the higher the melt strength. In the high shear rate region, the polymer is "processed" with shear rates in the die/extruder ranging anywhere from about 10 s$^{-1}$ to 1000 s$^{-1}$. As low of a viscosity as possible in this range is desired in order to minimize pumping pressure and melt fracture. Fortunately, most polymers exhibit at least some degree of viscosity reduction or "shear thinning" at higher shear rates, which aids in their "processability". Without the shear thinning, an extruder running a high melt viscosity polymer would require extremely high motor loads and/or very high melt temperatures, both of which can lead to polymer degradation and excessive energy consumption. In general, condensation polymers like polycarbonates and polyesters have a very low degree of shear thinning relative to addition type polymers like PVC and polyolefins. This is because the condensation polymers typically have narrower molecular weight distributions in addition to lacking the high molecular weight "tail" common in many addition polymers. This narrow molecular weight distribution makes polyesters more "Newtonian-like" (i.e. having a flat viscosity which does not depend much on shear rate) and characteristically harder to process.

Having a low viscosity at high shear rates (i.e. in the die) also serves to minimize the formation of melt fracture or "sharkskin" on the surface of the extruded part or article. Melt fracture is a flow instability phenomenon occurring during extrusion of thermoplastic polymers at the fabrication surface/polymer melt boundary. The occurrence of melt fracture produces severe surface irregularities in the extrudate as it emerges from the orifice. The naked eye detects this surface roughness in the melt-fractured sample as a frosty appearance or matte finish as opposed to an extrudate without melt fracture that appears clear.

Melt fracture occurs whenever the wall shear stress in the die exceeds a certain value (typically 0.1 to 0.2 MPa). In turn, shear stress is controlled by the volume throughput or line speed (which dictates the shear rate) and the viscosity of the polymer melt. By reducing either the line speed or the viscosity at high shear rates, the wall shear stress is reduced and the chance for melt fracture is lowered. Thus, by increasing the degree of shear thinning, the viscosity is reduced at high shear rates, which then allows higher line speeds before melt fracture occurs.

Coupling all of these desired properties together, the ideal polymer for profile extrusion clearly will have a high zero shear viscosity in conjunction with a high degree of shear thinning. This maximizes melt strength while at the same time minimizes melt fracture and die pressures. A representative "ideal" curve is illustrated in FIG. 1.

With respect to polyesters, either melt strength may be increased or melt fracture reduced without significantly affecting a change in the other. For example, by increasing the molecular weight or inherent viscosity of the polyester or by lowering the melt temperature, the zero shear viscosity will increase significantly along with the melt strength, but the degree of shear thinning will only change slightly. Thus, the melt strength will increase, but melt fracture will become even more of a problem since the high shear rate viscosity also increased significantly. This is in fact a problem for profile extrusions with polyesters and copolyesters. For example, in order to achieve an acceptable level of melt strength (i.e. greater than approximately 0 percent melt strength), PETG must be extruded at a melt temperature of 200° C. or lower. This is an extremely low processing temperature for a polymer normally designed to be run at 220° C. or higher. When run at this low temperature, PETG exhibits severe melt fracture even at low line speeds because the high shear rate viscosity is so high. This is due to the lack of significant shear thinning in PETG. Thus, with polyesters the process must be operated at either (1) hotter melt temperatures resulting in no melt fracture but too low melt strength or (2) low temperatures resulting in adequate melt strength but problems with melt fracture. Either scenario represents an economically unacceptable alternative for profile extrusion, so an improved processing polyester is needed that has both good melt strength and a high degree of shear thinning (i.e. melt fracture resistance).

Nevertheless, for some applications (e.g. flat film casting, extrusion blow molding, and foam extrusion) where the effective shear rates/stresses are already fairly low due to bigger die gaps and/or reduced extrusion rates, melt fracture may not be an issue. Thus, increasing just the melt strength alone may be acceptable. However, for profile extrusion, which typically has very high shear rates, both increased melt strength and resistance to melt fracture are important factors and should be improved simultaneously.

Chain branching is one of the most commonly used methods for improving the melt strength of a polymer, particularly polyesters. A tri-, tetra-, or higher functionality monomer is added to the polyester either during manufacture or in the processing step to create branches in the polymer. Typical branching agents for polyesters include trimellitic anhydride (TMA), pyromellitic dianhydride (PMDA), glycerol, sorbitol, hexane triol-1,2,6, pentaerythritol, trimethylolethane, and trimesic acid. Common applications for high melt strength polyesters include extrusion blow molding and foams.

U.S. Pat. No. 4,983,711 to Sublett describes high melt strength polyesters for extrusion blow molding applications. The polyester is poly(ethylene terephthalate) modified with 1,4-cyclohexanedimethanol (PETG) having from 0.05 to 1 mole percent of a tri-functional brancher, preferably trimellitic acid or anhydride. The 1,4-cyclohexanedimethanol (CHDM) levels are from 25 to 75 mole percent.

U.S. Pat. Nos. 5,523,382 and 5,442,036 to Beavers describe branched copolyesters suitable for extrusion blow molding. The branching agent is preferably trimellitic acid or anhydride. The copolyester contains an ethylene glycol component modified with 0.5 to 10 mole percent of CHDM and 3 to 10 mole percent of diethylene glycol. The acid component is terephthalic acid with up to 40 percent of isophthalic acid and naphthalenedicarboxylic acid.

U.S. Pat. No. 5,376,735 to Sublett describes high melt strength poly(ethylene terephthalate) (PET) for use in extrusion blow molding applications. The PET was blended with up to 3 mole percent isophthalic acid (IPA). A number of branching agents are mentioned including TMA.

Fukuda et. al. in U.S. Pat. No. 5,382,652 (reissued as RE35939) discloses a polyester resin branched with a range of tri- and tetra-functional materials including TMA and others. The resin composition is from 90 to 100 percent ethylene glycol and from 0 to 10 percent of one or more of the following: diethylene glycol, CHDM, propylene glycol, and butanediol. The application described is for improved processability around film extrusion, molding, and heat-sealability.

In U.S. Pat. No. 5,235,027, Thiele discloses a modified PET for extrusion blow molding. The PET contains from 0.5 to 5 wt. percent of isophthalic acid, 0.7 to 2.0 wt. percent of diethylene glycol, 300–2500 ppm tri- or tetra-hydroxyalkane, 80-150 ppm antimony, phosphorous of at least 25 percent by weight of the amount of antimony, red and blue toner (not exceeding 5 ppm), and various branching agents with pentaerythritol preferred. The resultant polyester has an IV between 0.8 and 1.5 dl/g.

Hauenstein in U.S. Pat. No. 4,182,841 describes a modified PET containing 12 mole percent neopentyl glycol terephthalate and 0.0062 mole percent of a polyfunctional modifying branching agent, including TMA.

Edelman et al, in U.S. Pat. Nos. 4,234,708, 4,219,527 and 4,161,579 disclose various high melt strength polyesters for extrusion blow molding. A variety of chain branching agents are utilized in amounts of from 0.025 to 1.5 mole percent with 0.25 to 10 equivalents of a chain terminator, which controls reaction conditions and prevents gelling. The importance of high zero shear viscosity coupled with shear sensitivity is also described.

Thus, there exists a need in art to have a polyester composition for use in profile extrusion which has both high melt strength to prevent sagging and excessive drawdown and a high degree of shear thinning to resist melt fracture at high processing speeds. Accordingly, it is to the provision of such that the present invention is primarily directed.

SUMMARY OF THE INVENTION

A process for producing a profile by profile extrusion comprises providing a melt of a polyester composition, which has a branching agent therein and an inherent viscosity of at least 0.65 dl/g, at a melt temperature and extruding the melt through a die to form a profile. The diacid component of the polyester composition comprises 100 to 98.0 mole percent of residues of a primary acid selected from the group consisting of terephthalic acid, naphthalene-dicarboxylic acid, isophthalic acid and mixtures thereof. The glycol component of the polyester composition comprises 100 to 98.0 mole percent of residues of a primary glycol selected from the group consisting of ethylene glycol, 1,4-cyclohexanedimethanol, diethylene glycol, neopentyl glycol, and mixtures thereof. The polyester composition comprises from 0.05 to 2.0 mole percent of residues of the branching agent selected from an acidic branching agent with a tri-functional or greater monomer, an alcoholic branching agent with a tri-functional or greater monomer, and mixtures thereof. The branching agent is present as part of either the diacid component or glycol component depending on whether the functionality is acidic or alcoholic, respectively.

DETAILED DESCRIPTION OF THE INVENTION

Polyester compositions as alternative materials for use in making profiles have heretofore been difficult to incorporate into profile extrusion processes. As discussed above, to obtain the requisite melt strength, polyesters are typically processed at lower temperatures and thus lower speeds to prevent melt fracture caused by the lack of shear thinning. The ideal polyester would thus have a high melt strength and a high degree of shear thinning so that the polyester could be run at the high speeds associated with profile extrusion without sagging and melt fracture.

The present invention addresses the problems of the prior art by providing a process for producing a profile by profile extrusion wherein a melt of a polyester composition, which has been modified by the addition of a tri-functional or greater branching agent, is extruded through a die to form a profile. Unexpectedly, this polyester provides both characteristics of high melt strength and a high degree of shear thinning making it suitable for use in profile extrusion processes. The branching agent imparts higher melt strength and a higher degree of shear thinning (i.e. resistance to melt fracture) to the polyester resulting in easier startup in the profile line, higher line speeds and better control of the final profile dimensions.

The polyester compositions of the present invention have an inherent viscosity (IV) of at least 0.65 dl/g, preferably at least 0.7 dl/g, providing the high melt strength necessary for profile extrusion. The polyester composition is based on 100 mole percent of a diacid component and 100 mole percent of a glycol component. A branching agent is present either as a portion of the mole percentage of the diacid component or the glycol component depending, respectively, on whether the branching agent has acid functionality or alcohol functionality as described below.

The polyester composition comprises a diacid component of from 100 to 98.0 mole percent, preferably 99.9 to 99.0 mole percent, of residues of a primary acid selected from terephthalic acid (TPA), isophthalic acid (IPA), naphthalene-dicarboxylic acid (NDA) or mixtures thereof. Preferably, TPA is the predominant primary acid (at least 60 mole percent) with up to 40 mole percent of IPA therein. A more preferred embodiment has TPA as the sole primary acid.

The primary acid of the diacid component may optionally be modified by replacing one or more of TPA, IPA and NDA with up to 40 mole percent of one or more different diacids, such as saturated aliphatic dicarboxylic acids having 4 to 12 carbon atoms and cycloaliphatic dicarboxylic acids having 8 to 12 carbon atoms. Specific examples of diacids are: phthalic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. It should be understood that use of the corresponding acid anhydrides, esters, and acid chlorides of these acids is included in the term "diacid".

The polyester composition comprises a glycol component of from 100 to 98.0 mole percent, preferably 99.9 to 99.0 mole percent, of residues of a primary glycol selected from ethylene glycol (EG), 1,4-cyclohexane-dimethanol (CHDM), diethylene glycol (DEG), neopentyl glycol (NPG), or mixtures thereof. A preferred level of EG and CHDM is from 0 to 100 mole percent, whereas a preferred level of NPG is from 0 to 40 mole percent. A small amount of DEG is usually also present as a side reaction in the manufacturing process, although it can be increased to higher levels if desired. A typical range for DEG is from 0 to 10 mole percent, with a preferable range from 0 to 3 mole percent. The most preferred embodiments have 57 to 90 mole percent EG with 10 to 40 mole percent of either CHDM or NPG and/or 0 to 3 mole percent of DEG.

In addition, the primary glycol of the glycol component can be modified with up to 40 mole percent of one or more different diols. Such additional diols include cycloaliphatic diols having 6 to 15 carbon atoms and aliphatic diols having 3 to 8 carbon atoms. Examples of such diols are: triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like.

The polyester composition further comprises from 0.05 to 2.0 mole percent, preferably 0.1 to 1.0 mole percent, of residues of a branching agent selected from an acidic branching agent comprising a tri-functional or greater monomer, an alcoholic branching agent comprising a tri-functional or greater monomer, or mixtures thereof. The acidic branching agent refers to branching agents containing acid moieties that react within the polyester chain. The alcoholic branching agent refers to branching agents containing alcohol moieties that react within the polyester chain. The branching agents comprising a tri-functional or greater monomer have at least three functional groups that can react to create branches in the polyester chain. Preferred branching agents include trimellitic anhydride (TMA), pyromellitic dianhydride (PMDA), glycerol, sorbitol, hexane triol-1,2,6, pentaerythritol, trimethylolethane, and trimesic acid. When the acidic branching agent is used in the present invention, the mole percentage is part of the acid component. When the alcoholic branching agent is used, the mole percentage is part of the glycol component.

In a preferred embodiment of this invention, TMA is present from 0.1 to 2 mole percent, based on 100 mole percent of the diacid component. Because of the difficulties in processing the higher levels of branching due to high reactor viscosities, in addition to the problem of gel formation, the most preferred level of TMA is from 0.1 to 0.35 mole percent. Below 0.1 percent TMA, the degree of processability improvement does not warrant the added cost of introducing the branching agent; whereas, above about 0.3 mole percent the reaction rate in a production facility becomes more difficult to control unless chain terminators are added. Chain terminators suitable for use in the present invention are monfunctional with an acid or alcohol functionality. Examples include stearic acid and benzoic acid. If the branching agent is tri-functional, the chain terminator and branching agent are preferably present at a ratio of 3:1 and more preferably at a ratio of 1:1. If the branching agent is tetra-functional, the chain terminator and branching agent are preferably present at a ratio of 4:1 and more preferably at a ratio of 2:1.

The melt strength of the polyester composition used in the profile extrusion process is preferably greater than about 0 percent at a particular melt temperature utilized in the process. Typical processing temperatures of the polyesters of the present invention are about 220 to 230° C. A "standard" profile should be processed without too much difficulty at about 0 percent melt strength. More complicated shapes might require a melt strength greater than about 20 percent, whereas simpler parts could be run adequately at melt strengths below 20 percent. As mentioned previously, melt strength is a strong function of the melt temperature, IV and, as described in this invention, the degree of branching agent. The melt strength as used herein is determined by using the test described in U.S. Pat. No. 4,398,022.

Figure 3:
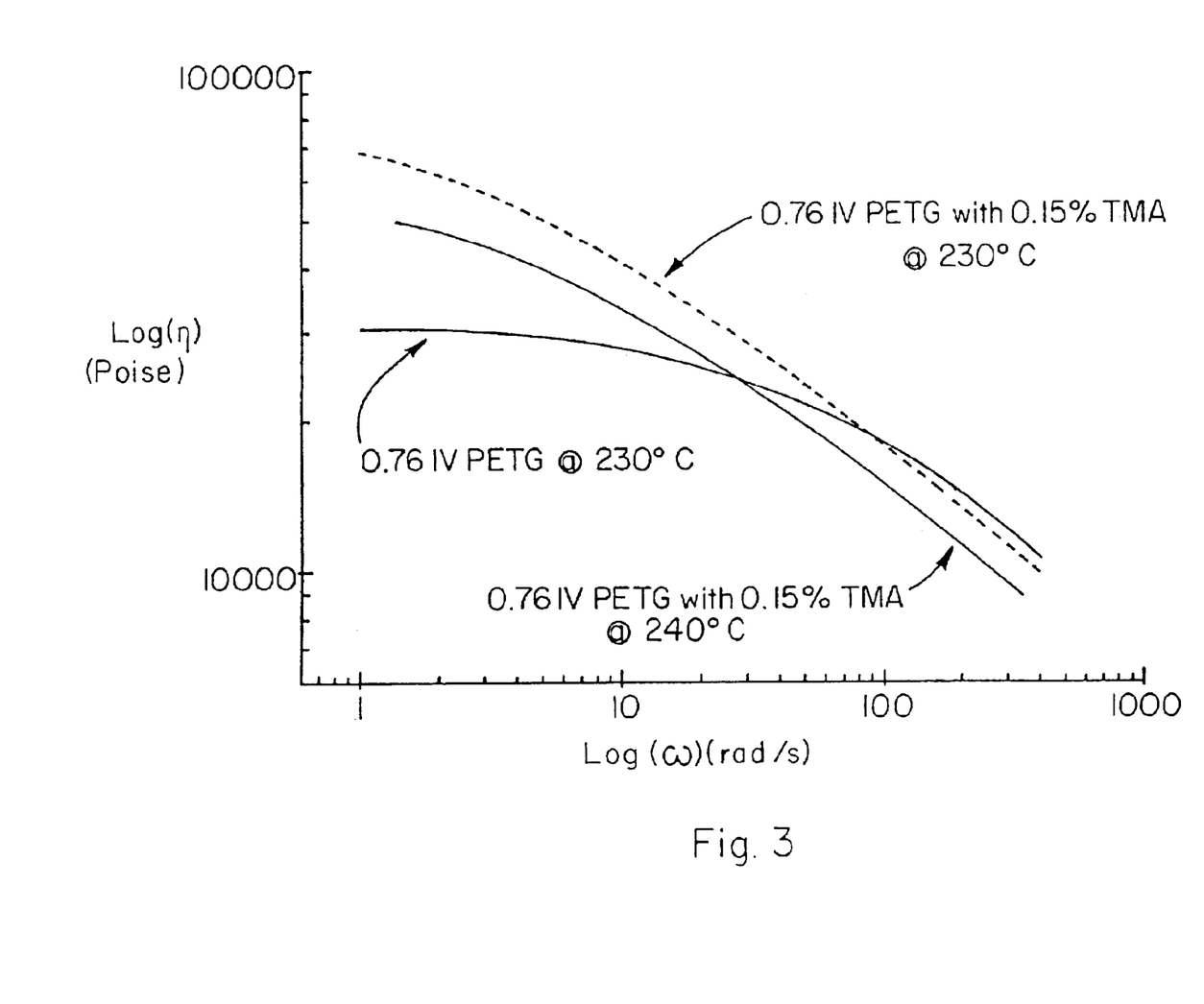
FIG. 3 is a viscosity curve for branched PETG at 230° C. and 240° C. and neat PETG at 230° C.

The polyester compositions utilized in the process of the present invention are further characterized by their high degree of shear thinning, i.e. having a low high shear rate viscosity, resulting in a profile that does not suffer from the phenomenon known as melt fracture. The "power law index, n" can be used to quantify the shear thinning. With reference to FIGS. 1 and 3, the slope of the viscosity versus shear rate curve in the high shear rate region, on a log-log plot, is equal to "n−1". If n is equal to 1 as in a purely Newtonian case, then the slope is equal to 0 and there is no shear thinning. As n gets smaller and smaller, the slope, or degree of shear thinning gets greater and greater with n=0 being the ultimate limit. To determine the power law indices, the slope is measured for a given curve over the region from about $\omega$=100 to $\omega$=400 wherein $\omega$ is the effective shear rate or rheometer test frequency, which is approximately equivalent to the shear rate. In FIG. 3, neat PETG (IV of 0.76 dl/g) at 230° C. has a value of n equal to 0.64. Typical values for linear polyesters range from 0.6 to 0.7 depending on IV and error in the measurement. PETG with 0.15 mole percent TMA (IV of 0.76 dl/g) at 230° C. and 240° C., embodiments of the present invention, have values of n=0.56 and n=0.57, respectively. Thus, in a preferred embodiment, the polyesters used in the process of the present invention have a power law index less than 0.6, more preferably less than 0.575, and even more preferably less than 0.5. As a comparison, other typical polymers used in profile extrusion have even lower values of n. The exact value depends on the type of polymer and how the polymer is made. For example, low density polyethylene, linear low density polyethylene, and metallocene are all polyethylenes that vary in n due to differences in branching and molecular weight distribution. Similarly, all of the so-called "easy to process" resins such as PVC and polystyrene have low values as well, typically less than 0.5.

The occurrence of melt fracture in a profile, as previously discussed, is typically a visual determination. Cloudy appearance is an indication of melt fracture, and a smooth clear appearance is an indication of no melt fracture. To quantify this lack of melt fracture in the resulting profile of the present invention, a surface roughness measurement is utilized. Surface roughness measurements are made using a Dektak3 profilometer over a scan length of 0.39 inches (10 mm) along the axial direction of the profile. For comparison with the visual determination, the RMS surface roughness measurement of a profile made using linear PETG having visible melt fracture is approximately 17000 Angstroms. The surface roughness took the form of periodically spaced bumps on the surface having a "wavelength" of approximately 1000 microns. This periodicity is typical of melt fracture due to the stick-slip behavior. The surface roughness for a profile made using the polyester of the present invention having a smooth appearance, i.e. no melt fracture, is approximately 400 to 500 Angstroms. The actual surface roughness of a "smooth" profile will vary depending on the roughness of the die tooling, cooling rate, etc. even if no melt fracture is present. Thus, profiles produced according to the present invention preferably have a surface roughness measurement of 5000 Angstroms (RMS) or less. More preferably, the surface roughness is 1000 Angstroms or less and even more preferably is 500 Angstroms or less.

The polyesters can be made via direct esterification of the acid and glycol, or through ester exchange of the glycol with the corresponding dimethyl ester (e.g. dimethyl terephthalate (DMT) in place of TPA or dimethyl isophthalate (DMA) in place of IPA). When using TMA as the branching agent and EG as one of the glycol components, the TMA is preferably pre-reacted with ethylene glycol before adding to the reactor. This reduces the amount of residual TMA left in the final product and minimizes the amount of TMA related extractables.

The branching agent may be added in the form of a concentrate or masterbatch that could be dry blended with the neat polyester just before entering the extruder. Nevertheless, the level of branching agent would have to be much higher (>0.5 mole percent) with the exact level depending on the masterbatch letdown ratio. Because of the higher level of branching agent in the concentrate, reaction conditions would have to be carefully controlled. However, this approach may not achieve the same broad MW distribution (thus reducing its effectiveness) compared to a condensation reactor grade product.

Inherent Viscosity (IV) as used herein is measured at 25° C. in a solvent mixture consisting of 60 percent by weight phenol and 40 percent by weight tetrachloroethane.

This invention can be further illustrated by the following examples of preferred embodiments thereof, although it will be understood that these examples are included merely for purposes of illustration and are not intended to limit the scope of the invention unless otherwise specifically indicated.

EXAMPLES

There are a number of quantitative and qualitative means for measuring melt strength. The standard test used for this invention is that disclosed in U.S. Pat. No. 4,398,022 and set forth herein above. Another common melt strength test involves measuring the time for the extrudate to reach a predetermined length at a given flowrate/shear rate. While not standardized, this test provides an easy method for material comparison on typical processing lines and is used in some of the examples. Other non-standard melt strength tests such as measuring the degree of drooping in a horizontal profile extrusion line can also be applied giving a more application specific measure of melt strength.

Melt fracture is more difficult to measure quantitatively and no standardized test has been developed. This is because a moderately melt-fractured part typically has a hazy, rough surface, which is immediately noticeable to the naked eye. Thus, visible melt fracture makes a profile extrusion unacceptable, particularly for polyesters, where it is usually desired that the profile be clear. Nevertheless, optical transmission and surface roughness measures, as already mentioned, can be applied effectively although visual observation is still the most common method.

Example 1

Film Extrusion Comparison of PETG and 0.3 Mole Percent TMA Modified PETG

An unbranched PETG with 31 mole percent modification of CHDM and IV of 0.76 dl/g (Control 1) and a branched PETG with 31 mole percent modification CHDM, 0.30 mole percent TMA and an IV of 0.715 (Example 1) were extruded on a 1" (2.54 cm) Killion extruder (24:1 L/D, Maddock mixing section screw) using a 6" (15.2 cm) film die, a 12 (0.3 mm) mil gap and a 60 RPM screw speed Extrusion temperatures were the same for both polymers (feed zone temperature=210° C., all other zones at 230° C.). At a time denoted as "time zero", the die was scraped, and the polymer then allowed to flow until such a point that it contacted the floor (approximately a 4 foot (1.2 m) height). This time was denoted as the "sag time".

For the Control 1, the sag time was 20+/−2 seconds, whereas for Example 1, the sag time was 31+/−1 seconds. Thus the melt strength of Example 1 was about 50 percent higher than the Control 1 by this measure. The die pressures for the Control 1 and Example 1 were 1480 psi (10 MPa) and 1400 psi (9.6 MPa), respectively. Similarly the screw loads were 14 and 8.9 amps, respectively. The die pressures and screw loads are indicative of the shear thinning and ease of extrusion. Clearly, the TMA increases the melt strength while reducing the energy and pressure required to pump the material (a lower pressure indicates a lower probability for melt fracture since it relates to the wall shear stress).

Example 2
Profile Extrusion Trials with PETG Samples

Different combinations of TMA vs. polyester resin IV samples were processed on a profile extrusion line and tested for melt strength. Since there was no known method for quantifying melt strength online, a method was devised (referred to herein as the "Sag Test") using a die and calibration tooling setup designed to make flat, thin (at die exit) profile shapes. The dimensions of the extrudate at the die exit was 3 inches (7.6 cm) by 0.080 inches (0.2 cm). Running at 30 ft/min (9.1 m/min) line speed, PETG with 31 mole percent modification of CHDM (Control 2) was extruded at conditions (temperature and screw speed, etc.) which were on the verge of melt fracture so as to establish a point (aesthetically) at which to set conditions for the test. After allowing the profile line to run for an hour in order to reach equilibrium conditions, the calibration tooling was gradually distanced from the die. This was done until 1) the face of the calibration tooling was exactly 20 inches (50.8 cm) from the face of the die or 2) the extrudate "sagged" to the point of not being able to run thus causing a system shutdown.

During this "Sag Test", the Control 2 extrudate often sagged to the floor causing system shutdown and thus failed the Sag Test. The polyester compositions of the present invention did not fall to the floor, but rather continued to run allowing for measurement of the amount of sag, and thus passed the Sag Test. A video camera was fixed 3 feet (92 cm) from the sagging extrudate for each sample. Pictures similar to that shown in FIG. 2 were taken. The point where the extrudate exits the die is 43.5 inches (110.5 cm) from the floor (referred to herein as the "Zero Sag" point). This is also the same height where the extrudate enters the water tank. Once each sample (while sagging) reached a state where maximum sag had been reached, the number of inches from the floor to the bottom of the sagging extrudate was recorded. This measurement was then subtracted from the Zero Sag point to give a Sag Value for each sample. Lower Sag Values indicate higher melt strength materials.

Figure 2:
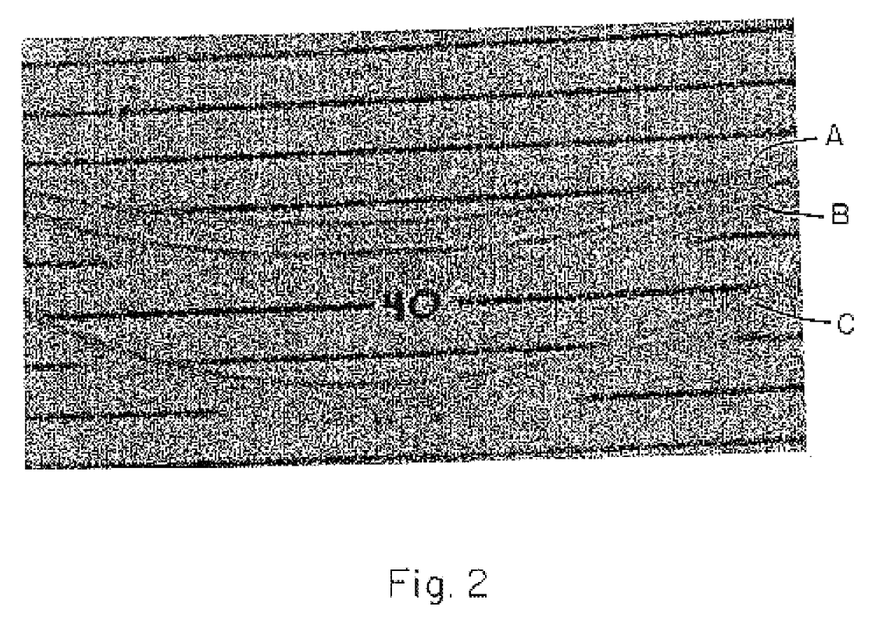
FIG. 2 is a photograph of actual profiles in their sagged state at constant throughput for PETG resins having different inherent viscosities and the same branching level.

FIG. 2 is an image showing superimposition of actual extrudates in their sagging state. The samples in FIG. 2 were made using the composition of Control 2 and containing 0.15 mole percent TMA as the branching agent. Sample A (IV of 0.80 dl/g) had a Sag Value of 2.47 inches (6.27 cm) a melt temperature of 229° C. Sample B (IV of 0.76 dl/g) had a Sag Value of 3.34 inches (8.48 cm) at a melt temperature of 226° C. Sample C (IV of 0.74 dl/g) had a Sag Value of 5.91 inches (15.01 cm) at a melt temperature of 224° C.

Table 1 below contains Sag Value data for other samples of polyester compositions with varying amounts of TMA and values of IV.

Example 3
Rheological Data for Branched and Unbranched PETG having a 0.76 IV

The melt strength test utilized in Example 2 was developed specifically for profile extrusion. The degree of drooping in a horizontal profile extrusion line between the die and the water bath for a given distance of separation is measured.

Samples of PETG having an IV of 0.76 dl/g were prepared both with and without TMA branching agent. The PETG has a 31 mole percent modification of CHDM. The viscosity curves for the branched PETG (0.15 mole percent TMA) at 230° C. and 240° C. and for the unbranched PETG at 230° C. are shown in FIG. 3. If the ratio of the viscosity at 1 rad/s over the viscosity at 400 rad/s is used as a "processability index", the unbranched resin has a processability index of 2.9 whereas the branched resin has an index of 7 measured at the same temperature. Thus, the branched resin will be much easier to process and have better melt strength than the unbranched resin. Additionally, by increasing the temperature of the branched resin by 10° C., both melt strength and shear thinning properties of the resin were enhanced.

Example 4
Melt Strength Data for Branched and Unbranched PETG having a 0.76 IV

Using the same samples as in Example 3, melt strength measurements were performed at a temperature of 220° C. using a capillary rheometer and the standard protocol outlined earlier. The unbranched PETG had a melt strength of −26 percent at 220° C., whereas the 0.15 mole percent TMA branched PETG had a melt strength of 4 percent. Clearly the branched PETG is much better suited for profile extrusions at this temperature because its melt strength is greater than 0 percent. The linear PETG would have to be run much colder to achieve the same melt strength, thereby increasing the likelihood of melt fracture.

Example 5
Branched and Unbranched Copolyesters Containing Neopentyl Glycol

Samples of a copolyester of containing a glycol component of 37 mole percent of neopentyl glycol (NPG) and 63 mole percent of ethylene glycol and a diacid component of terephthalic acid were produced both with and without branching agent to an IV of 0.70 dl/g. Branching levels were 0, 0.15 or 0.30 mole percent of TMA. The measurements for viscosity were at 230° C. The zero shear viscosity was measured at a shear rate of 1 rad/s and the high shear viscosity was measured at a shear rate of 400 rad/s. As clearly indicated by the data in Table 2 below, the use of branching agents significantly improves the processability of NPG based copolyesters.

TABLE 1

| Sample: % TMA and IV | 0%<br>0.76 | 0.1%<br>0.76 | 0.1%<br>0.78 | 0.21%<br>0.74 | 0.135%<br>0.78 | 0.1%<br>0.80 | 0.215%<br>0.785 |
|---|---|---|---|---|---|---|---|
| Sag Value (in) | Failed | 8.13 | 7.38 | 5.44 | 4.13 | 2.38 | 1.88 |
| Sag Value (cm) | Failed | 20.65 | 18.75 | 13.82 | 10.49 | 6.05 | 4.78 |
| Melt Temp (C.) | 224 | 227 | 227 | 224 | 225 | 226 | 229 |

TABLE 2

| Sample % Branching Agent | zero shear viscosity, poise | high shear viscosity, poise | process-ability index | power law index |
|---|---|---|---|---|
| 0% TMA | 18000 | 7100 | 2.5 | 0.64 |
| 0.15% TMA | 54000 | 8100 | 6.7 | 0.53 |
| 0.30% TMA | 78000 | 7800 | 10 | 0.47 |

Example 6
Branched and Unbranched Copolyesters Containing Isophthalic Acid

Figure 4:
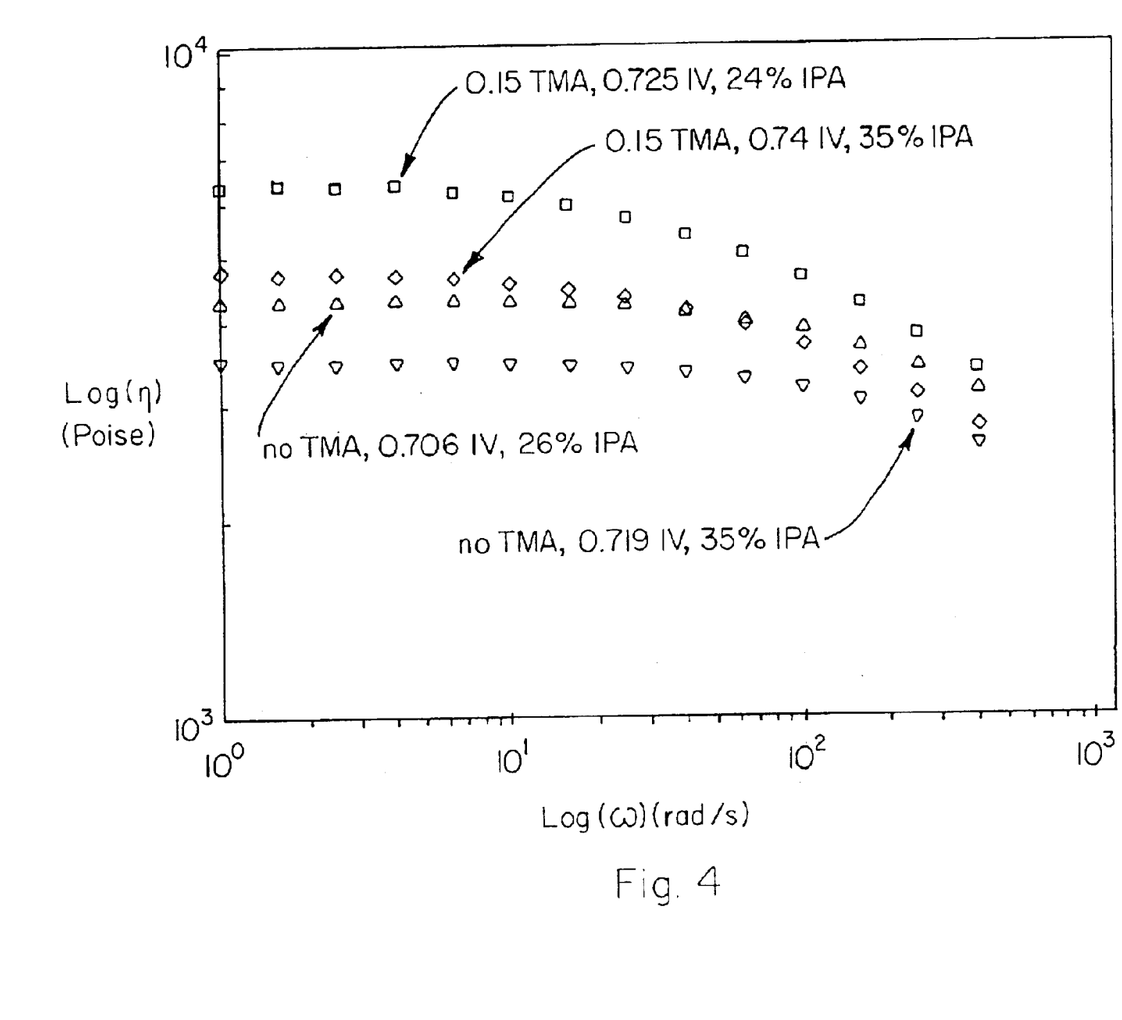
FIG. 4. is a viscosity curve at 270° C. for copolyesters modified with either 24 mole percent or 35 mole percent isophthalic acid and containing no or 0.15 percent branching agent.

Samples of a copolyester containing 100 mole percent CHDM as the glycol component and a diacid component of either 24 or 35 mole percent of isophthalic acid (IPA) and correspondingly 76 or 65 mole percent of terephthalic acid, respectively, were produced both with and without branching agent. The viscosity curves of the four samples are depicted in FIG. 4. As observed in FIG. 4, the degree of shear thinning is much greater in the branched samples making them more processable. The power law index for the four samples are set forth in Table 3. While these examples of branched IPA modified resins have a power law index of greater than 0.6, which is a preferred embodiment of the present invention, the data indicates that branch does improve processability of the resins making them more suitable for use in profiles. The data indicates that a higher level of branching agent would be required to lower the power law index.

TABLE 3

| Sample Description | n |
|---|---|
| 24% IPA, 0% TMA | 0.83 |
| 24% IPA, 0.15% TMA | 0.74 |
| 35% IPA, 0% TMA | 0.83 |
| 35% IPA, 0.15% TMA | 0.77 |

Thus, the present invention provides polyester compositions that are suitable for use in making profiles by profile extrusion. These polyesters have higher melt strengths and higher shear thinning than linear polyesters making them extremely suitable for profile extrusion processes.

We claim:

1. A profile made by profile extrusion comprising a polyester composition having an inherent viscosity of at least 0.65 dl/g and comprising:
   (a) a diacid component comprising 100 to 98.0 mole percent of residues of a primary acid selected from the group consisting of terephthalic acid, naphthalenedicarboxylic acid, isophthalic acid and mixtures thereof;
   (b) a glycol component comprising 100 to 98.0 mole percent of residues of a primary glycol selected from the group consisting of ethylene glycol, 1,4-cyclohexanedimethanol, diethylene glycol, neopentyl glycol, and mixtures thereof; and
   (c) 0.05 to 2.0 mole percent of residues of a branching agent selected from the group consisting of an acidic branching agent comprising a tri-functional or greater monomer, an alcoholic branching agent comprising a tri-functional or greater monomer, and mixtures thereof;

wherein the polyester composition is based on 100 mole percent of the diacid component and 100 mole percent of the glycol component and the acidic branching agent comprises a portion of the diacid component and the alcoholic branching agent comprises a portion of the glycol component.

2. The profile of claim 1 wherein a power law index of the polyester composition is less than 0.6.

3. The profile of claim 1 having a surface roughness of 5000 Angstroms or less.

4. The profile of claim 3 having a surface roughness of 1000 Angstroms or less.

5. The profile of claim 4 having a surface roughness of 500 Angstroms or less.

* * * * *